Patented Sept. 3, 1940

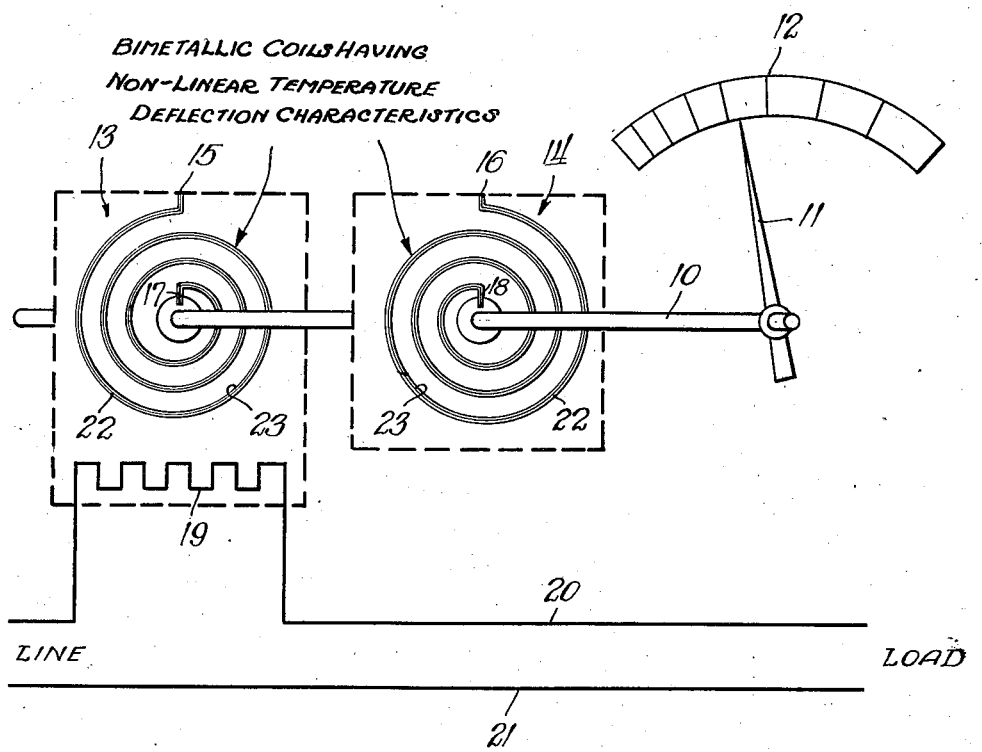

2,213,339

UNITED STATES PATENT OFFICE 2,213,339

THERMAL METERING APPARATUS

William C. Downing, Jr., Springfield, Ill., assignor to Lincoln Meter Company, Inc., Springfield, Ill., a corporation of Illinois Application August 31, 1938, Serial No. 227,658

3 Claims. (Cl. 171—95)

My invention relates, generally, to electrical measuring devices and it has particular relation to indicating thermal demand meters in which electric energy is converted into heat that causes a mechanical deflection proportional to a function of the quantity measured.

A thermal demand meter comprises relatively few moving parts. It includes a pair of oppositely wound bimetallic coils, the outer ends of which are fixed to the meter frame and the inner ends are joined to a shaft which carries a pointer that cooperates with a scale for indicating the quantity being measured. Alternatively, the shaft may carry a pen for recording a continuous indication on a chart in a graphic type of instrument. As long as the temperature of the two coils is the same, no motion of the shaft results, even though this temperature changes, since the tendency of each of the coils to expand with rising temperature just balances that of the other. However, when the temperature of one coil is higher than that of the other, there results a deflection of the pointer carried by the shaft or the pen carried thereby which is proportional to the temperature difference between the coils. The pair of coils, in this manner, constitutes a thermometer which measures a difference in temperature rather than an absolute temperature.

Each of the bimetallic coils is contained in an individual enclosure and one or both of these enclosures is arranged to be electrically heated. Heat applied to an enclosure tends to raise the temperature of the enclosure and the bimetallic coil contained therein by an amount closely proportional to the rate at which the heat is applied. The temperature difference between enclosures, as measured by the bimetallic coils, is therefore closely proportional to the difference in the rates of heat input to the two enclosures, hereinafter referred to simply as the "power input differential."

Various means, well known in the prior art, are employed to provide a power input differential which is proportional or closely proportional to a function of the quantity to be measured. For example, in an instrument intended for measuring the current flow in a two wire circuit, only one enclosure is heated. The power input differential is therefore in this case simply the power input to the heated enclosure, and is proportional to the square of the current measured. The heating of the enclosure is accomplished by means of a non-inductive resistor which is connected directly in the circuit if the expected current flow is below a certain predetermined value and is indirectly connected in the circuit by means of a shunt or a transformer if the current flow in the circuit is expected to exceed a predetermined value.

Another example is that of an instrument for measuring the flow of power in alternating current circuits. In this case heat is applied to both enclosures but at different rates so that the power input differential is closely proportional to the power flow it is intended to measure. Means for doing this are described in the prior art and are used in commercial instruments.

The operation of a thermal demand meter employing the two opposed bimetallic coils is based upon the following assumptions:

(1) A constant relation between the power input differential and some function of the quantity measured.
(2) A constant relation between the power input differential and temperature differential.
(3) A constant relation between the temperature differential and the mechanical deflection of the shaft resulting in the movement of the pointer across the scale or the movement of the pen across the chart.

While the third assumption is correct and the conditions there stated are met very closely in thermal demand meters employing two opposed bimetallic coils, the conditions recited in assumptions 1 and 2 are only approximately attained. For example, ambient temperature variations may change the conditions recited in assumption 1 due to change of some or all of the electrical circuit resistances and certain of the conditions in assumption 2 may be changed due to change in heat transfer rates.

Ordinarily two adjustments are provided for a thermal demand meter. One of these is the zero setting adjustment and the other is a deflection adjustment. Both of these adjustments are provided to permit initial calibration of the meter and to permit recalibration of the meter after it has been in service.

The zero adjustment is provided by means of a light spiral hair spring which may be manually rotated to add to or subtract from the amount of deflection of the shaft the desired amount so that when no current is passing through the heating element or elements, the pointer or pen will be at the zero position. The action of the zero adjustment is independent of the positions of the pointer or pen.

The full load adjustment or the deflection adjustment is such that it alters the reading of any point on the scale by an amount which is proportional to the pointer deflection. It is provided by means of a helical tension spring which is secured at one end to the pointer, the tension thereof being adjustable at the other end. The helical tension spring is so arranged that, when the pointer is in the zero position, no torque is exerted thereon. At all other positions of the pointer, the helical tension spring exerts a torque which is approximately proportional to the deflection.

As indicated above, there are certain departures from the assumed conditions for perfect accuracy of the instrument. One of the principal sources of error is the change in ambient temperature which, as indicated above, changes the electrical circuit resistances of the heating elements and also changes the heat transfer rates. In the past it has been the practice to provide external compensating means for overcoming the error due to change in ambient temperature. The means that has been employed comprises a bimetal helix which is positioned outside of the housings of the bimetal coils which actuate the shaft and pointer or pen carried thereby. The bimetallic helix is connected to operate through the helical tension spring and to vary the tension thereof in accordance with change in ambient temperature. This external compensating means has not been entirely satisfactory.

Accordingly, the principal object of my invention is to so construct a thermal demand meter of the type herein described that compensation for changes in ambient temperature are inherent therein.

Another object of my invention is to so proportion the thermally responsive elements of a thermal demand meter that the provision of an external compensating device for changes in ambient temperature is unnecessary.

A further object of my invention is to employ a bimetallic element or elements in a thermal demand meter having variable temperature-deflection ratios in order to automatically compensate for changes in ambient temperature.

According to the present invention, the foregoing objects are accomplished by making either or both of the bimetallic elements of such materials that instead of having a constant temperature-deflection ratio or linear characteristics, they will have a variable temperature-deflection ratio or non-linear characteristics in order to compensate for variations resulting from changes in ambient temperature. By properly proportioning the compositions of the alloys making up the bimetallic strips, it is possible to increase the temperature-deflection ratio with rising temperature. If desired, the bimetallic strips may be overcompensated to take care of other factors which tend to make the indication of the instrument inaccurate.

For a more complete understanding of the nature and scope of my invention reference may be had to the following detailed description taken in connection with the accompanying drawing in which the single figure illustrates diagrammatically a thermal demand meter in which my present invention is embodied.

Referring now to the drawing, it will be observed that a shaft 10 is provided and it will be understood that it may be mounted for rotation on bearings (not shown) at its ends. The shaft 10 carries a pointer 11 which is arranged to cooperate with a scale 12 in order to give an indication of the quantity being measured. It will be understood that a pen may be substituted for the pointer 11 for drawing a line on a chart to graphically record the variations in the quantity being measured.

In order to rotate the shaft 10 in order to produce the desired deflection of the pointer 11, a pair of oppositely wound bimetallic coils, shown generally at 13 and 14, is provided. The coil 13 may be termed the driving element and the coil 14 may be termed the retarding element. The outer ends 15 and 16 of the elements 13 and 14 are secured to the meter frame while the inner ends 17 and 18 are secured to the shaft 10. In the meter construction shown in the drawing a single heating element 19 is provided in the enclosure around the driving element 13. The heating element 19 comprises a non-inductive resistor which is connected in conductor 20 of a pair of conductors 20 and 21. The conductors 20 and 21 may be connected in either a direct current or an alternating current circuit.

As previously indicated, the elements 13 and 14 are formed by bimetallic coils. They comprise flat strips of bimetal that are coiled as illustrated. The outer layer 22 of metal may be Invar, an iron alloy containing iron 63.8%, nickel 36%, and carbon 0.2%. The inner layer 23 may comprise brass.

It has been the practice in the past to make the elements 13 and 14 of such character that they have a constant temperature-deflection ratio or a linear characteristic such that the angular deflection of the shaft 10 per change in degree of temperature is constant rather than variable. When such a construction is employed, it is necessary, as indicated hereinbefore, to provide some auxiliary external means for compensating for variations in change in ambient temperature.

I have found that the compensation for changes in ambient temperature may be made inherent in the construction of the bimetallic elements 13 and 14 so that it is unnecessary to employ the external compensating means. One manner of effecting this desired result is to increase the nickel content of the outer layer 22 of the Invar from about 36% to about 40%. A bimetallic strip is then obtained which has an increasing temperature-deflection ratio with rising temperature which may be employed for inherently compensating for the errors which result due to variations in the conditions arising under the assumptions (1) and (2) set forth hereinbefore. If desired, the characteristics of the elements 13 and 14 may be changed so that the device will be slightly overcompensated.

While it has been particularly pointed out how the elements 13 and 14 can be changed by changing the alloy composition of the outer layer 22, it will be understood that the compositions of both the outer and inner layers 22 and 23 may be altered to produce the non-linear characteristics as desired. It will also be understood that bimetals, other than the particular bimetal herein disclosed, may be employed if they have the desired compensating characteristics. For example, the brass component of the bimetal herein described may be replaced by a steel alloy, such as chrome-vanadium steel, having the required characteristics.

Since certain changes may be made in the foregoing embodiment of the invention without departing from the scope thereof, it is intended that all matter contained in the above description or shown in the accompanying drawing shall be interpreted as illustrative and not in a limiting sense.

I claim as my invention:

1. A thermal meter for an electric circuit comprising, in combination, a shaft, indicating means carried by said shaft, a pair of oppositely wound bimetallic coils each fastened to said shaft at one end and stationarily secured at the other end, at least one of said bimetallic coils being characterized by having a non-linear temperature deflection ratio with change in temperature to automatically compensate for different ambient temperatures under normal load conditions, and means for heating at least one of said coils in accordance with a variable characteristic of the electric circuit.

2. A thermal meter for an electric circuit comprising, in combination, a shaft, indicating means carried by said shaft, a pair of oppositely wound bimetallic coils each fastened to said shaft at one end and stationarily secured at the other end, both of said bimetallic coils being characterized by having substantially identical non-linear temperature deflection ratios with change in temperature such that the indication afforded by said indicating means under load conditions is substantially unaffected by changes in ambient temperature over the normal range thereof, and means for supplying heat to at least one of said coils in accordance with a variable characteristic of the electric circuit.

3. A thermal meter for an electric circuit comprising, in combination, a shaft, indicating means carried by said shaft, a pair of oppositely wound bimetallic coils each fastened to said shaft at one end and stationarily secured at the other end, one of the layers of metal forming each coil being of brass and the other being of Invar having a nickel content of about 40% whereby the coils have substantially identical non-linear temperature deflection ratios with change in temperature such that the indication afforded by said indicating means under load conditions is substantially unaffected by changes in ambient temperature over the normal range thereof, and means for supplying heat to at least one of said coils in accordance with a variable characteristic of the electric circuit.

WILLIAM C. DOWNING, JR.